United States Patent
Jeong et al.

(10) Patent No.: US 12,416,803 B2
(45) Date of Patent: Sep. 16, 2025

(54) ELECTRONIC DEVICE AND OPERATING METHOD THEREOF

(71) Applicant: SAMSUNG ELECTRONICS CO., LTD., Suwon-si (KR)

(72) Inventors: Youngmo Jeong, Suwon-si (KR); Kyusub Kwak, Suwon-si (KR); Jaeyeol Ryu, Suwon-si (KR); Jeonggeun Yun, Suwon-si (KR); Myongjo Choi, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 661 days.

(21) Appl. No.: 17/877,413

(22) Filed: Jul. 29, 2022

(65) Prior Publication Data
US 2023/0085129 A1  Mar. 16, 2023

Related U.S. Application Data

(63) Continuation of application No. PCT/KR2022/008763, filed on Jun. 21, 2022.

(30) Foreign Application Priority Data

Sep. 10, 2021  (KR) ........................ 10-2021-0121182

(51) Int. Cl.
*G02B 26/08* (2006.01)
*G01J 1/04* (2006.01)
(Continued)

(52) U.S. Cl.
CPC ........ *G02B 26/0875* (2013.01); *G01J 1/0448* (2013.01); *G01J 1/4228* (2013.01); *G02B 27/0172* (2013.01); *G02B 2027/0138* (2013.01)

(58) Field of Classification Search
CPC ............ G02B 26/0875; G02B 27/0172; G02B 2027/0138; G01J 1/0448; G01J 1/4228
(Continued)

(56) References Cited

U.S. PATENT DOCUMENTS

| | | |
|---|---|---|
| 8,317,338 B2 | 11/2012 | Itoh et al. |
| 9,958,936 B2 | 5/2018 | Sawada et al. |

(Continued)

FOREIGN PATENT DOCUMENTS

| | | |
|---|---|---|
| EP | 3 349 051 A1 | 7/2018 |
| JP | 2011-70141 A | 4/2011 |

(Continued)

OTHER PUBLICATIONS

International Search Report (PCT/ISA/220 and PCT/ISA/210) and Written Opinion (PCT/ISA/237) issued Sep. 21, 2022 by the International Searching Authority in International Application No. PCT/KR2022/008763.

(Continued)

*Primary Examiner* — Bumsuk Won
*Assistant Examiner* — Grant A Gagnon
(74) *Attorney, Agent, or Firm* — Sughrue Mion, PLLC

(57) ABSTRACT

Provided is an electronic device including an optical engine including a projection lens configured to project light of a virtual image, a waveguide including an input grating on which the light of the virtual image is incident, an actuator configured to adjust a position of the projection lens relative to an optical axis of the projection lens, a light sensor configured to detect light passing through the input grating, a memory configured to store one or more instructions, and a processor configured to execute the one or more instructions to obtain a degree of parallelism of the light detected by the light sensor, obtain, based on the degree of parallelism of the light, a position adjustment value of the projection (Continued)

lens to detect light, and control the actuator to adjust a distance between the projection lens and the waveguide based on the position adjustment value.

18 Claims, 11 Drawing Sheets

(51) Int. Cl.
*G01J 1/42* (2006.01)
*G02B 27/01* (2006.01)

(58) Field of Classification Search
USPC .......................................................... 359/630
See application file for complete search history.

(56) References Cited

U.S. PATENT DOCUMENTS

| | | |
|---|---|---|
| 10,054,795 B2 | 8/2018 | Mukawa |
| 10,488,653 B2 | 11/2019 | Wall et al. |
| 10,516,820 B2 | 12/2019 | Yoon et al. |
| 10,539,793 B2 | 1/2020 | Mukawa |
| 10,901,223 B2 | 1/2021 | Yeoh et al. |
| 11,092,806 B2 | 8/2021 | Lee et al. |
| 11,204,462 B2 | 12/2021 | Klug et al. |
| 11,221,458 B2 | 1/2022 | Hwang et al. |
| 2008/0151097 A1 | 6/2008 | Chen et al. |
| 2011/0019109 A1 | 1/2011 | Maeda et al. |
| 2013/0162917 A1 | 6/2013 | Sagawa et al. |
| 2013/0300635 A1 | 11/2013 | White et al. |
| 2022/0299771 A1 | 9/2022 | Yamada et al. |

FOREIGN PATENT DOCUMENTS

| | | |
|---|---|---|
| JP | 2020-506419 A | 2/2020 |
| JP | 2021-63929 A | 4/2021 |
| KR | 10-2019-0009104 A | 1/2019 |
| KR | 10-2019-0124172 A | 11/2019 |
| KR | 10-2020-0075532 A | 6/2020 |
| WO | 2020/139752 A1 | 7/2020 |

OTHER PUBLICATIONS

Communication issued Nov. 4, 2024 by the European Patent Office in European Patent Application No. 22867512.0.

ELECTRONIC DEVICE AND OPERATING METHOD THEREOF

CROSS-REFERENCE TO RELATED APPLICATION

This application is a bypass continuation application of International Application No. PCT/KR2022/008763, filed on Jun. 21, 2022, which is based on and claims the priority to Korean Patent Application No. 10-2021-0121182, filed on Sep. 10, 2021, in the Korean Intellectual Property Office, the disclosures of which are incorporated by reference herein in their entireties.

BACKGROUND

1. Field

The disclosure relates to an electronic device and operating method for providing a high-quality virtual image by automatically adjusting a focus point of a projection lens.

2. Description of Related Art

Augmented reality (AR) is a technology that projects a virtual image onto a physical real-world environment space or a real-world object to display a single image. An AR device allows a user to simultaneously see a real scene and a virtual image via a see-through display module positioned in front of a user's eyes while being worn on a user's face or head.

In order for the AR device to provide various AR services using virtual images, such as clearly showing a virtual image on a real scene, research on a method of automatically adjusting a focus point of a projection lens that provides light from a virtual image is required.

SUMMARY

Provided are an electronic device and operating method for providing a high-quality virtual image by automatically adjusting a focus point of a projection lens.

Technical problems to be solved are not limited to the technical problems as described above, and other technical problems may exist.

According to an aspect of the disclosure, there is provided an electronic device including an optical engine including a projection lens configured to project light of a virtual image, a waveguide including an input grating on which the light of the virtual image is incident, an actuator configured to adjust a position of the projection lens relative to an optical axis of the projection lens, a light sensor configured to detect light passing through the input grating, a memory storing one or more instructions, and a processor configured to execute the one or more instructions to obtain a degree of parallelism of the light detected by the light sensor, obtain, based on the degree of parallelism of the light, a position adjustment value of the projection lens to detect light, and control the actuator to adjust a distance between the projection lens and the waveguide based on the position adjustment value.

The input grating is provided on a first surface of the waveguide and comprises a diffraction grating so that light incident on the waveguide through the input grating changes a path within the waveguide, and the light sensor may be provided on a second surface of the waveguide opposite to the first surface, and configured to receive light that is not diffracted within the waveguide from among the light passing through the input grating.

The light sensor may include an image sensor, and the processor may be further configured to execute the one or more instructions to detect, by using the image sensor, a contrast value of a pixel region of the virtual image, based on light that is not diffracted within the waveguide but transmitted through a transmission region from among the light passing through the input grating, and obtain, based on the detected contrast value, the degree of parallelism of the light passing through the input grating.

The light sensor may include a phase difference sensor including two optical sensors that are spaced apart from each other, and the processor may be further configured to execute the one or more instructions to detect a phase difference via the two optical sensors, based on light that is not diffracted in the waveguide but transmitted through a transmission region from among the light passing through the input grating, and obtain, based on the detected phase difference, the degree of parallelism of light passing through the input grating.

The light sensor may include a photodiode sensor, and the photodiode sensor may be configured to receive light diffracted from a diffraction region opposite to the input grating from among light that passes through the input grating but is not diffracted in the waveguide.

The processor may be further configured to execute the one or more instructions to detect, by using the photodiode sensor, intensity of the light diffracted from the diffraction region opposite to the input grating, and obtain, based on the detected intensity of the light, the degree of parallelism of the light.

According to an aspect of the disclosure, there is provided an operating method of an electronic device including a projection lens configured to project light of a virtual image, the operating method including detecting, by a light sensor, light passing through an input grating of a waveguide on which the light of the virtual image is incident, obtaining a degree of parallelism of the light detected by the light sensor, obtaining, based on the degree of parallelism of the light, a position adjustment value of the projection lens to detect parallel light, and controlling an actuator to adjust a distance between the projection lens and the waveguide based on the position adjustment value.

The input grating is provided on a first surface of the waveguide and comprises a diffraction grating so that light incident on the waveguide through the input grating changes a path within the waveguide, and the light sensor may be provided on a second surface of the waveguide opposite to the first surface, and configured to receive light that is not diffracted within the waveguide from among the light passing through the input grating.

The light sensor may include an image sensor, the detecting of the light may include detecting, by using the image sensor, a contrast value of a pixel region of the virtual image, based on light that is not diffracted within the waveguide but transmitted through a transmission region from among the light passing through the input grating, and the obtaining of the degree of parallelism of the light may include obtaining, based on the detected contrast value, the degree of parallelism of the light passing through the input grating.

The light sensor may include a phase difference sensor including two optical sensors spaced apart from each other, the detecting of the light may include detecting a phase difference via the two optical sensors, based on light that is not diffracted in the waveguide but transmitted through a transmission region from among the light passing through the input grating, and the obtaining of the degree of parallelism of the light may include obtaining, based on the detected phase difference, the degree of parallelism of the light passing through the input grating.

The light sensor may include a photodiode sensor, and the photodiode sensor may be configured to receive light diffracted from a diffraction region opposite to the input grating from among light that passes through the input grating but is not diffracted in the waveguide.

The detecting of the light may include detecting, by using the photodiode sensor, intensity of the light diffracted from the diffraction region opposite to the input grating, and the obtaining of the degree of parallelism of the light may include obtaining, based on the detected intensity of the light, the degree of parallelism of the light.

According to an aspect of the disclosure, there is provided a computer-readable recording medium having recorded thereon a program for executing an operating method of an electronic device including a projection lens configured to project light of a virtual image on a computer, the method including detecting, by a light sensor, light passing through an input grating of a waveguide on which the light of the virtual image is incident, obtaining a degree of parallelism of the light detected by the light sensor, obtaining, based on the degree of parallelism of the light, a position adjustment value of the projection lens to detect parallel light, and controlling an actuator to adjust a distance between the projection lens and the waveguide based on the position adjustment value.

The input grating may be provided on a first surface of the waveguide and includes a diffraction grating configured to diffract a portion of the light incident on the waveguide through the input grating within the waveguide, and the light sensor may be provided on a second surface of the waveguide opposite to the first surface, and configured to receive light that is not diffracted within the waveguide from among the light passing through the input grating.

The light sensor may include an image sensor, the detecting of the light may include detecting, by using the image sensor, a contrast value of a pixel region of the virtual image, based on light that is not diffracted within the waveguide but transmitted through a transmission region from among the light passing through the input grating, and the obtaining of the degree of parallelism of the light may include obtaining, based on the detected contrast value, the degree of parallelism of the light passing through the input grating.

The light sensor may include a phase difference sensor including two optical sensors spaced apart from each other, the detecting of the light may include detecting a phase difference via the two optical sensors, based on light that is not diffracted in the waveguide but transmitted through a transmission region from among the light passing through the input grating, and the obtaining of the degree of parallelism of the light may include obtaining, based on the detected phase difference, the degree of parallelism of the light passing through the input grating.

The light sensor may include a photodiode sensor, and the photodiode sensor may be configured to receive light diffracted from a diffraction region opposite to the input grating from among light that passes through the input grating but is not diffracted in the waveguide.

The detecting of the light may include detecting, by using the photodiode sensor, intensity of the light diffracted from the diffraction region opposite to the input grating, and the obtaining of the degree of parallelism of the light may include obtaining, based on the detected intensity of the light, the degree of parallelism of the light.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
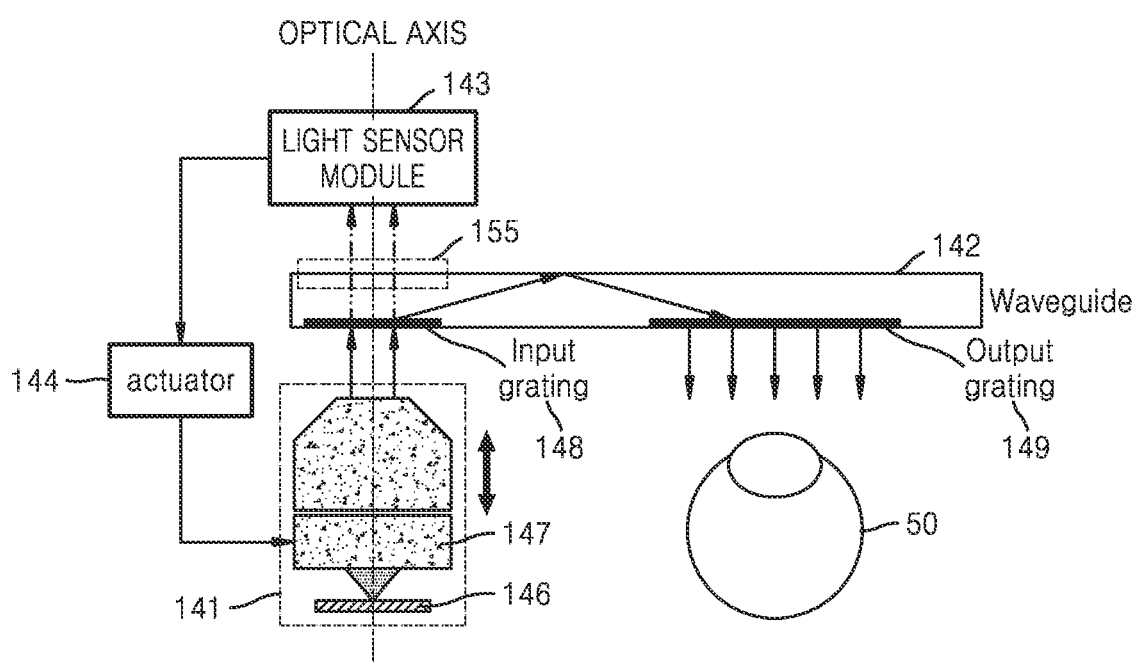
FIG. 1 is a diagram of an electronic device according to an embodiment of the disclosure.

Throughout the disclosure, the expression "at least one of a, b or c" indicates only a, only b, only c, both a and b, both a and c, both b and c, all of a, b, and c, or variations thereof.

Embodiments of the disclosure will be described more fully hereinafter with reference to the accompanying drawings so that they may be easily implemented by one of ordinary skill in the art. However, embodiments of the disclosure may have different forms and should not be construed as being limited to the embodiments set forth herein. In addition, parts not related to descriptions of the disclosure are omitted to clearly explain embodiments of the disclosure in the drawings, and like reference numerals denote like elements throughout.

The terms used in the disclosure are general terms currently widely used in the art based on functions described in the disclosure, but may have different meanings according to an intention of skilled persons in the related art, precedent cases, advent of new technologies, etc. Thus, the terms used herein should be defined not by simple appellations thereof but based on the meaning of the terms together with the overall description of the disclosure.

Although the terms such as "first", "second", etc. may be used herein to describe various elements or components, these elements or components should not be limited by the terms. The terms are only used to distinguish one element or component from another element or component.

In addition, the terms used herein are only used to describe particular embodiments of the disclosure, and are not intended to limit the disclosure. Singular expressions used herein are intended to include plural expressions as well unless the context clearly indicates otherwise. Furthermore, throughout the specification, it will be understood that when a part is referred to as being "connected" or "coupled" to another part, it may be directly connected to or electrically coupled to the other part with one or more intervening elements therebetween. Throughout the specification, when a part "includes" or "comprises" an element, unless there is a particular description contrary thereto, it is understood that the part may further include other elements, not excluding the other elements.

The use of the terms "the" and similar referents used in the specification, especially in the following claims, are to be construed to cover both the singular and the plural. Furthermore, operations of methods according to the disclosure described herein may be performed in any suitable order unless clearly specified herein. Embodiments of the disclosure are not limited to the described order of the operations.

Expressions such as "in some embodiments" or "in an embodiment" described in various parts of this specification do not necessarily refer to the same embodiment(s).

Some embodiments of the disclosure may be described in terms of functional block components and various processing operations. Some or all of such functional blocks may be implemented by any number of hardware and/or software components that execute specific functions. For example, functional blocks of the disclosure may be implemented by one or more microprocessors or by circuit components for performing certain functions. Furthermore, functional blocks according to the disclosure may be implemented with various programming or scripting languages. The functional blocks may be implemented using various algorithms executed on one or more processors. Furthermore, the disclosure may employ techniques of the related art for electronic environment setting, signal processing, and/or data processing. The terms such as "mechanism", "element", "means", and "construction" may be used in a broad sense and are not limited to mechanical or physical components.

Furthermore, connecting lines or connectors shown in various figures are intended to represent exemplary functional connections and/or physical or circuit couplings between components in the figures. In an actual device, connections between components may be represented by many alternative or additional functional relationships, physical connections, or circuit connections.

In the disclosure, augmented reality (AR) is a technology for showing a virtual image simultaneously in a physical real-world environment space or showing a real object and a virtual image together.

In addition, an AR device is a device capable of realizing AR, and examples of the AR device generally include AR glasses worn on a user's face, an AR helmet or a head mounted display (HMD) apparatus worn over a user's head, etc.

Further, a real scene is a scene in the real world that a user sees through an AR device, and may include a real-world object. Furthermore, a virtual image is an image generated via an optical engine and may include both a static image and a dynamic image. Such a virtual image is observed together with a real scene, and may be an image representing information about a real-world object in the real scene, information about an operation of an AR device, or a control menu.

Therefore, a general AR device may include an optical engine for generating a virtual image formed by light produced by a light source, and a waveguide for guiding a virtual image generated by the optical engine onto a user's eyes and which is composed of a transparent material so that the user may also see a rea-world scene while watching the virtual image. As described above, because the AR device needs to be able to observe a scene of the real world together with a virtual image, an optical element for changing a path of light having a directionality is required to guide light generated by the optical engine onto the user's eyes via a waveguide. In this case, the path of light may be changed using reflection by a mirror or the like or through diffraction by a diffractive element such as a diffractive optical element (DOE) or a holographic optical element (HOE), but embodiments of the disclosure are not limited thereto.

Hereinafter, the disclosure is described in detail with reference to the accompanying drawings.

FIG. 1 is a diagram illustrating an embodiment of the disclosure.

An electronic device 100 (FIGS. 2 and 3) according to an embodiment of the disclosure may be an AR device. For example, the electronic device 100 may be a device implemented in the form of glasses that may be worn on a user's face. Furthermore, the electronic device 100 may be a device implemented in the form of goggles, a helmet, a hat, etc. which may be worn on a user's head, but is not limited thereto.

Figure 2:
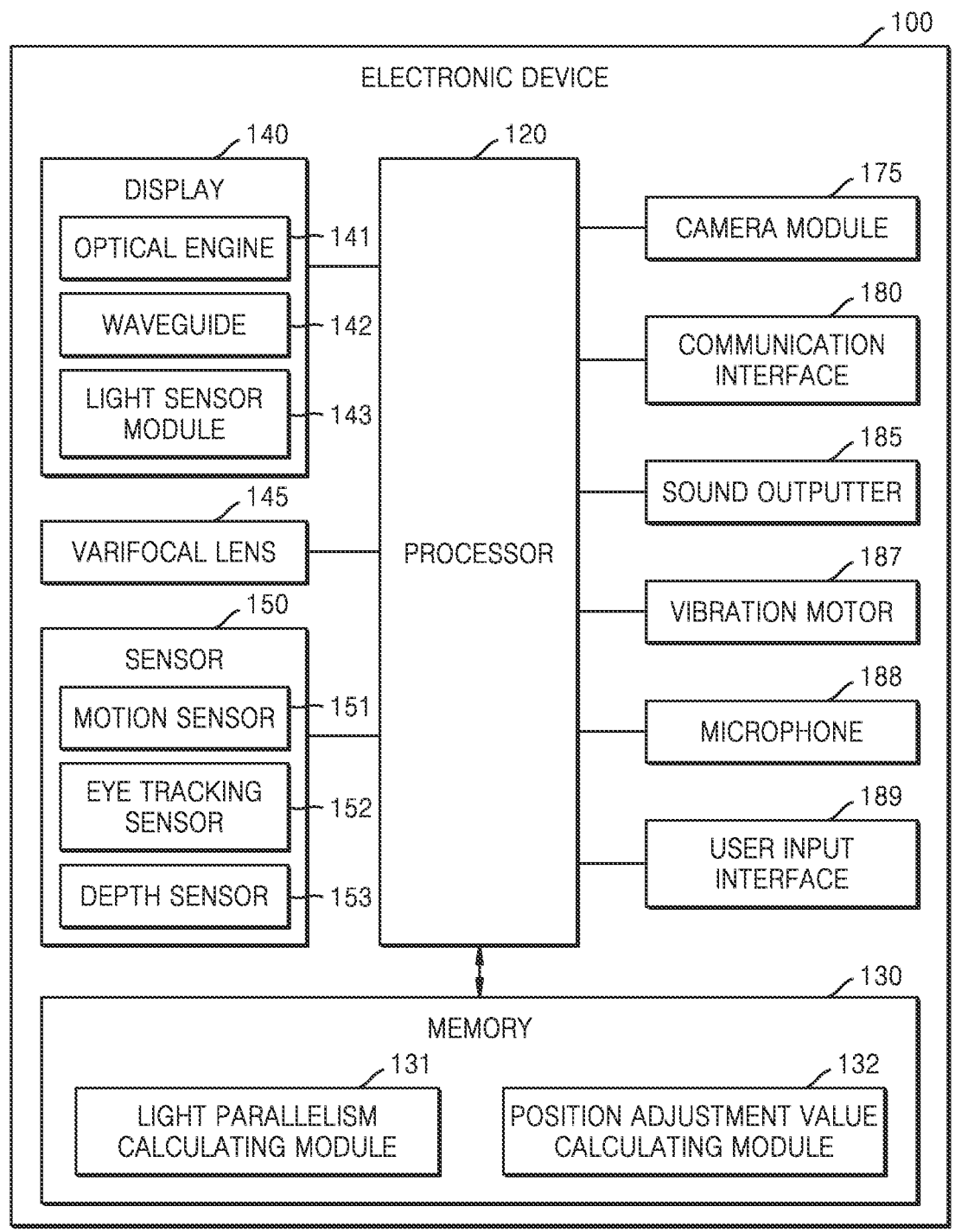
FIG. 2 is a block diagram of an electronic device according to an embodiment of the disclosure.

According to an embodiment of the disclosure, when providing an AR service, the electronic device 100 may output a virtual object in a virtual image onto a display 140 (FIG. 2). Accordingly, a user wearing the electronic device 100 may observe a scene of the real world together with a virtual object.

According to an embodiment of the disclosure, the display 140 of the electronic device 100 may include a waveguide 142 and an optical engine 141.

Referring to FIG. 1, the waveguide 142 may face an exit surface of the optical engine 141 and receive light of a virtual image projected from the optical engine 141. The light of the virtual image may be projected from the optical engine 141 toward an input grating 148 of the waveguide 142, and light diffracted within the waveguide 142 may be output toward an eye 50 of a user wearing the electronic device 100 via the output grating 149. Accordingly, the user wearing the electronic device 100 may observe a virtual image via the waveguide 142.

The optical engine 141 may include a light source emitting light, an image panel 146 that forms a virtual image by using the light emitted by the light source, and a projection lens 147 that projects light of a virtual image formed on the image panel 146.

According to an embodiment of the disclosure, the projection lens 147 may be arranged so that light projected from the projection lens 147 may be incident on the input grating 148 of the waveguide 142 in parallel to an optical axis. When the light projected from the projection lens 147 is incident on the input grating 148 of the waveguide 142 in parallel to the optical axis, light diffracted in the waveguide 142 may be output via the output grating 149 in the form of parallel light so that a virtual image seen by the eye 50 of the user may be clearly recognized.

When an arrangement position of the projection lens 147 changes due to physical distortion of the projection lens 147 or the like or a back focal length between the projection lens 147 and the image panel 146 changes according to temperature changes inside and outside the electronic device 100 or a usage environment, light projected from the projection lens 147 onto the input grating 148 may be not parallel. In this case, when the light diffracted within the waveguide 142 is output via the output grating 149, the light is not parallel, so that the virtual image seen by the user's eyes may not be clearly recognized.

According to an embodiment of the disclosure, the electronic device 100 may monitor a degree of parallelism of light projected from the projection lens 147 onto the input grating 148 by using the light sensor 143 and automatically and adaptively adjust a position of the projection lens 147 so that the parallelism of the light is maintained. Accordingly, the electronic device 100 may provide a high-quality, clear virtual image via the waveguide 142.

According to an embodiment of the disclosure, the light sensor 143 provided on an outer surface of a transmission region 155 of the waveguide 142 may detect light that has passed through the transmission region 155. The electronic device 100 may calculate (obtain) a degree of parallelism of light, which indicates whether the light detected by the light sensor 143 is incident as parallel light.

When the light detected by the light sensor 143 is not incident as parallel light, the electronic device 100 may control an actuator 144 to automatically adjust a position of the projection lens 147 relative to an optical axis so that parallel light may be detected, thereby adjusting a distance between the projection lens 147 and the waveguide 142.

According to an embodiment of the disclosure, the electronic device 100 may provide a high-definition virtual image to a user wearing the electronic device 100 by adaptively and automatically adjusting the position of the projection lens 147.

According to an embodiment of the disclosure, the electronic device 100 may detect, via the light sensor 142, light projected from the projection lens 147 onto the waveguide 142 over a preset sensing period. The sensing period may be set when the electronic device 100 is manufactured. In addition, the sensing period may be changed and set by detecting a change in temperature inside and outside the electronic device 100, etc., but is not limited thereto.

Figure 12:
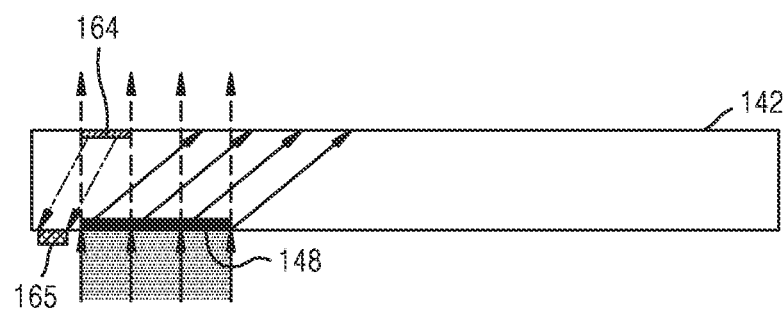
FIG. 12 is a diagram for describing a method of calculating the degree of parallelism of light by using a photodiode sensor, according to an embodiment of the disclosure.

As shown in FIG. 1, according to an embodiment of the disclosure, the light sensor 143 may be disposed on a front surface of the waveguide 142 opposite to the optical engine 141, but is not limited thereto. As shown in FIG. 12 below, the light sensor 143 may be disposed on a rear surface of the waveguide 142.

According to an embodiment of the disclosure, the input grating 148 of the waveguide 142 may be configured as a diffraction grating such that light incident through the input grating 148 changes an optical path within the waveguide 142. However, according to the percentage (e.g., 20%) of light diffracted by a diffraction grating constituting the input grating 148, non-diffracted light (e.g., 80%) among light passing through the input grating 148 may be transmitted through the transmission region 155 of the waveguide 142 without changing the optical path.

According to an embodiment of the disclosure, the transmission region 155 may be a surface opposite to the input grating 148 on the front surface of the waveguide 142. The transmission region 155 may refer to a region through which non-diffracted light among the light passing through the input grating 148 is transmitted as the non-diffracted light passes through the front surface of the waveguide 142.

According to an embodiment of the disclosure, the rear surface of the waveguide 142 is a surface facing the eye 50 of the user when the user wears the electronic device 100, and the front surface of the waveguide 142 is a surface opposite to the rear surface (a side of the waveguide 142 farther away from the eye 50 of the user).

FIG. 1 is illustrated to explain an embodiment of the disclosure, but is not limited thereto.

FIG. 2 is a block diagram of an electronic device according to an embodiment of the disclosure.

According to an embodiment of the disclosure, an electronic device 100 may be an AR device having a communication function and a data processing function and providing an AR image, but is not limited thereto.

Referring to FIG. 2, according to an embodiment of the disclosure, the electronic device 100 may include a memory 130, a processor 120, a display 140, a varifocal lens 145, a sensor 150, and a camera 175, a communication interface 180, a sound output interface 185, a vibration motor 187, a microphone 188, and a user input interface 189. However, all of the components shown in FIG. 2 are not necessarily essential components of the electronic device 100. The electronic device 100 may be implemented with more or fewer components than those illustrated in FIG. 2.

The processor 120 of the electronic device 100 may execute programs stored in the memory 130 to control all operations of the display 140, the varifocal lens 145, the sensor 150, the camera 175, the communication interface 180, the sound output interface 185, the vibration motor 187, the microphone 188, the user input interface 189, etc.

According to an embodiment of the disclosure, the memory 130 may store programs to be executed by the processor 120 or store data input to or output from the electronic device 100.

The memory 130 may include at least one type of storage medium, i.e., at least one of a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, or an optical disc.

Programs stored in the memory 130 may be categorized into a plurality of software modules according to their functions. For example, the programs may include, but are not limited to, a light parallelism calculating module 131 and a position adjustment value calculating module 132, and include some of them or further include other software modules.

The processor 120 may control all operations of the electronic device 100. The processor 120 may execute instructions or programs stored in the memory 130 to control operations or functions performed by the electronic device 100.

According to an embodiment of the disclosure, the processor 120 may include one or a plurality of processors. For example, the processor 120 may consist of at least one of a central processing unit (CPU), a microprocessor, a graphics processing unit (GPU), application specific integrated circuits (ASICs), digital signal processors (DSPs), digital signal processing devices (DSPDs), programmable logic devices (PLDs), or field programmable gate arrays (FPGAs), but is not limited thereto.

The processor 120 may calculate a degree of parallelism of light detected by the light sensor 143 by executing the light parallelism calculating module 131 stored in the memory 130.

According to an embodiment of the disclosure, the degree of parallelism of light may indicate a degree to which incident light is parallel. A higher degree of parallelism of light may indicate that parallel light is incident. The degree of parallelism of light may be quantified based on a preset mathematical equation or algorithm.

According to an embodiment of the disclosure, the light sensor 143 may include at least one of an image sensor, a phase difference sensor, or a photodiode sensor.

According to an embodiment of the disclosure, the processor 120 may detect a contrast value of a pixel region of a virtual image by using an image sensor 161 (FIG. 8), and calculate a degree of parallelism of light based on the detected contrast value. For example, when a contrast value detected by using the image sensor 161 is greater than or equal to a preset value, the processor 120 may determine that parallel light is incident.

Furthermore, according to an embodiment of the disclosure, the processor 120 may detect a phase difference by using two optical sensors in a phase difference sensor 162 (FIG. 10), and calculate a degree of parallelism of light based on the detected phase difference. For example, when a phase difference detected by using the phase difference sensor 162 is less than or equal to a preset value, the processor 120 may determine that parallel light is incident.

In addition, according to an embodiment of the disclosure, the processor 120 may detect, by using a photodiode sensor 165 (FIG. 12), intensity of light diffracted from a diffraction region 164 (FIG. 12) in a surface opposite to the input grating 148 based on light that is not diffracted in the waveguide 142 among light passing through the input grating 148. The processor 120 may calculate a degree of parallelism of the light passing through the input grating 148 based on the detected intensity of the light. For example, when an intensity of the light detected by using the photodiode sensor 165 is greater than or equal to a preset value, the processor 120 may determine that parallel light is incident.

The processor 120 may calculate, based on a degree of parallelism of light, a position adjustment value of the projection lens 147 for detecting parallel light by executing the position adjustment value calculating module 132 stored in the memory 130.

According to an embodiment of the disclosure, a position adjustment value of the projection lens 147 may be an adjustment value including a direction in which and a distance by which the projection lens 147 has to be moved from its current position relative to the optical axis in order to adjust a distance to the waveguide 142 so that light projected from the projection lens 147 is incident as parallel light on the input grating 148 of the waveguide 142.

According to an embodiment of the disclosure, when it is determined, based on a result of the calculation by the light parallelism calculating module 131, that parallel light is not incident, the processor 120 may calculate a position adjustment value including a direction and a distance of movement of the projection lens 147. For example, the position adjustment value may include information indicating a certain number of millimeters (mm) the projection lens 147 needs to move up, down, left, or right relative to the optical axis.

According to an embodiment of the disclosure, the position adjustment value may be calculated based on a predefined position adjustment algorithm for a projection lens. For example, the position adjustment algorithm may be a method of finding, after moving the projection lens approximately in a desired direction, an optimal position thereof while adjusting a distance of movement at narrower intervals, but is not limited thereto. In addition, the position adjustment algorithm may be a method of finding an optimal position of the projection lens by relatively precisely calculating a direction and a distance that the projection lens is to be moved.

According to an embodiment of the disclosure, the processor 120 may control the actuator 144 (FIG. 1) to adjust a position of the projection lens 147 based on the calculated position adjustment value.

The display 140 may output information processed by the processor 120. For example, the display 140 may display a virtual object.

According to an embodiment of the disclosure, the display 140 may provide an AR image. According to an embodiment of the disclosure, the display 140 may include the waveguide 142 and the optical engine 141.

The waveguide 142 may be formed of a transparent material that makes a region of the rear surface visible when the user wears the electronic device 100. The waveguide 142 may be formed as a flat plate having a single-layer or multi-layer structure of a transparent material inside which light may be reflected as it propagates. The waveguide 142 may face the exit surface of the optical engine 141 and receive light of a virtual image projected from the optical engine 141. Here, the transparent material refers to a material that allows light to pass therethrough, and may not have 100% transparency but have a preset color.

In an embodiment of the disclosure, as the waveguide 142 is formed of a transparent material, the user may see not only a virtual object in a virtual image but also an external real scene via the display 140, and thus, the waveguide 142 may also be a see-through display. The display 140 may provide an AR image by outputting a virtual object in a virtual image via the waveguide 142.

The varifocal lens 145 may be mounted to the electronic device 100 to compensate for a visual field defect in a user's eyes. The varifocal lens 145 may be arranged to overlap the waveguide 142 so as to face the user's eyes. The varifocal lens 145 may be generally implemented as a liquid lens or liquid crystal lens. For example, the varifocal lens 145 may be implemented as a liquid lens in which a flexible plastic membrane encapsulates a transparent fluid. As a fluid in the varifocal lens 145 moves according to an electrical signal applied to the varifocal lens 145, a refractive power of the varifocal lens 145 may be changed. As another example, the varifocal lens 145 may be implemented as a liquid crystal lens in which transparent electrodes are provided on both sides of a transparent liquid crystal layer. As arrangement of liquid crystals in the liquid crystal layer is changed according to an electrical signal applied to a transparent electrode, a path of light passing through the liquid crystal lens may be changed, and accordingly, a refractive power of the varifocal lens 145 may be changed.

For example, a value of an electrical signal or voltage applied to a transparent electrode may be preset so that a refractive power of the varifocal lens 145 corresponds to a diopter value (e.g., . . . −3 D, −2 D, −1 D, 0, 1 D, 2 D, 3 D . . . ), and when an electrical signal or voltage is applied to the transparent electrode, a refractive power of a corresponding diopter may be applied to the varifocal lens 145.

However, embodiments of the disclosure are not limited thereto, and for example, a value of an electrical signal or voltage applied to the electrode may be preset so that the refractive power of the varifocal lens 145 may be changed to continuous values.

When the electronic device 100 is a device in the form of eyeglasses, the varifocal lens 145 may include a left-eye varifocal lens and a right-eye varifocal lens.

The sensor 150 may include, for example, a motion sensor 151, an eye tracking sensor 152, and a depth sensor 153.

The motion sensor 151 may be an inertial measurement unit (IMU). The IMU may be a combination of sensors configured to detect movement of an object in a three-dimensional (3D) space, for example, changes in the object's position and orientation. For example, the combination of sensors may include an accelerometer, a gyroscope, and a geo-magnetometer.

In addition, the motion sensor 155 may include at least one of, for example, an acceleration sensor, a magnetic sensor, or a gyroscope sensor.

The eye tracking sensor 152 may detect gaze information of the user's eyes. According to an embodiment of the disclosure, the gaze information may include at least one of a gaze direction in which a user's eye is looking, a position of a pupil of the user's eye, or coordinates of a center point of the pupil.

The eye tracking sensor 152 may provide light to a user's eye (the left or right eye) and detect light reflected from the user's eye. The eye tracking sensor 152 may detect, based on the detected reflected light, a direction of a user's eye gaze, a position of a pupil of the user's eye, coordinates of a center point of the pupil, etc.

According to another embodiment, the eye tracking sensor 152 may provide light to a user's eye and capture an image of the user's eye. The eye tracking sensor 152 may detect, based on the captured image of the user's eye, a direction of a user's eye gaze, a position of a pupil of the user's eye, coordinates of a center point of the pupil, etc.

According to an embodiment of the disclosure, the eye tracking sensor 152 may obtain an image reflected by the user's eye by capturing the image of the user's eye.

The depth sensor 153 may obtain depth information of one or more objects included in the real world. The depth information may correspond to a distance from the depth sensor 153 to a particular object. A depth value may increase as a distance from the depth sensor 153 to the particular object increases.

According to an embodiment of the disclosure, the depth sensor 153 may obtain depth information of an object by using various methods. For example, the depth sensor 153 may obtain depth information by using at least one of a time of flight (TOF) method, a structured light method, or a stereo image method. The stereo image type depth sensor 153 is generally composed of two or more cameras.

According to an embodiment of the disclosure, the depth sensor 153 may sense depth information of a real-world object contained in a real scene viewed by a user wearing the electronic device 100 through the waveguide 142. The processor 120 may obtain, based on the depth information of the real-world object sensed by the depth sensor 153, information about the presence or absence of the real-world object in front of the electronic device 100, a direction of the real-world object, a distance to the real-world object, etc.

In addition, the depth sensor 153 may sense depth information of fingers of a hand of the user wearing the electronic device 100. The processor 120 may obtain, based on the depth information of the fingers sensed by the depth sensor 153, an input of a user's hand gesture by recognizing a shape of the user's hand, a pattern in which the user's hand moves, etc.

The camera 175 may capture images of the surroundings of the electronic device 100. The camera 175 may obtain image frames from a video or still images via an image sensor when an application requiring a capture function is executed.

An image captured via the image sensor may be processed by the processor 120 or a separate image processor. Furthermore, the captured image may be displayed on the display 140.

In addition, an image frame processed by the processor 120 or the separate image processor may be stored in the memory 130 or transmitted outside via the communication interface 180.

Two or more cameras 175 may be provided according to a configuration of the electronic device 100.

According to an embodiment of the disclosure, the camera 175 may obtain images including a real scene by capturing images of the surroundings of the electronic device 100.

The communication interface 180 may include one or more components that enable the electronic device 100 to communicate with an external server or an external device.

For example, the communication interface 180 may include a short-range wireless communication unit and a mobile communication unit.

The short-range wireless communication unit may include, for example, a Bluetooth communication unit, a near-field communication (NFC)/radio-frequency identification (RFID) unit, a wireless local area network (WLAN) (or Wi-Fi) communication unit, a Zigbee communication unit, an Infrared Data Association (IrDA) communication unit, an ultra-wideband (UWB) communication unit, an Ant+ communication unit, etc., but are not limited thereto.

The mobile communication unit transmits or receives a wireless signal to or from at least one of a base station, an external terminal, or a server on a mobile communication network. In this case, the wireless signal may be a voice call signal, a video call signal, or data in any one of various formats for transmission and reception of a text/multimedia message.

The sound output interface 185 outputs audio data received from the communication interface 180 or stored in the memory 130. The sound output interface 185 outputs sound signals associated with functions executed by the electronic device 100 (for example, a call signal reception sound, a message reception sound, and a notification sound).

According to an embodiment of the disclosure, the sound output interface 185 may include a speaker, a buzzer, and the like. According to an embodiment of the disclosure, the sound output interface 185 may be mounted to the electronic device 100 or implemented in the form of detachable earphones. Furthermore, according to an embodiment of the disclosure, the sound output interface 185 may output a sound using bone conduction.

The vibration motor 187 may output a vibration signal. For example, the vibration motor 187 may output a vibration signal corresponding to an output of audio data or video data (e.g., a call signal reception sound, a message reception sound, etc.). In addition, the vibration motor 187 may output a vibration signal when a user input is received from the user input interface 195. Furthermore, the vibration motor 187 may provide a notification in the form of vibration when the electronic device 100 operates in a vibration mode.

The microphone 188 receives an external sound signal and process the sound signal as electrical audio data. For example, the microphone 188 may receive a sound signal from an external device or a user. The microphone 188 may receive a user's voice input for controlling the electronic device 100. The microphone 188 may use various noise canceling algorithms to remove noise generated in the process of receiving an external sound signal.

The user input interface 189 refers to a device via which the user inputs data for controlling the electronic device 100. The user input interface 189 may include, but is not limited to, at least one of a keypad, a dome switch, a touch pad (a capacitive overlay type, a resistive overlay type, an infrared beam type, a surface acoustic wave type, an integral strain gauge type, a piezoelectric type, etc.), a jog wheel, or a jog switch.

Figure 3:
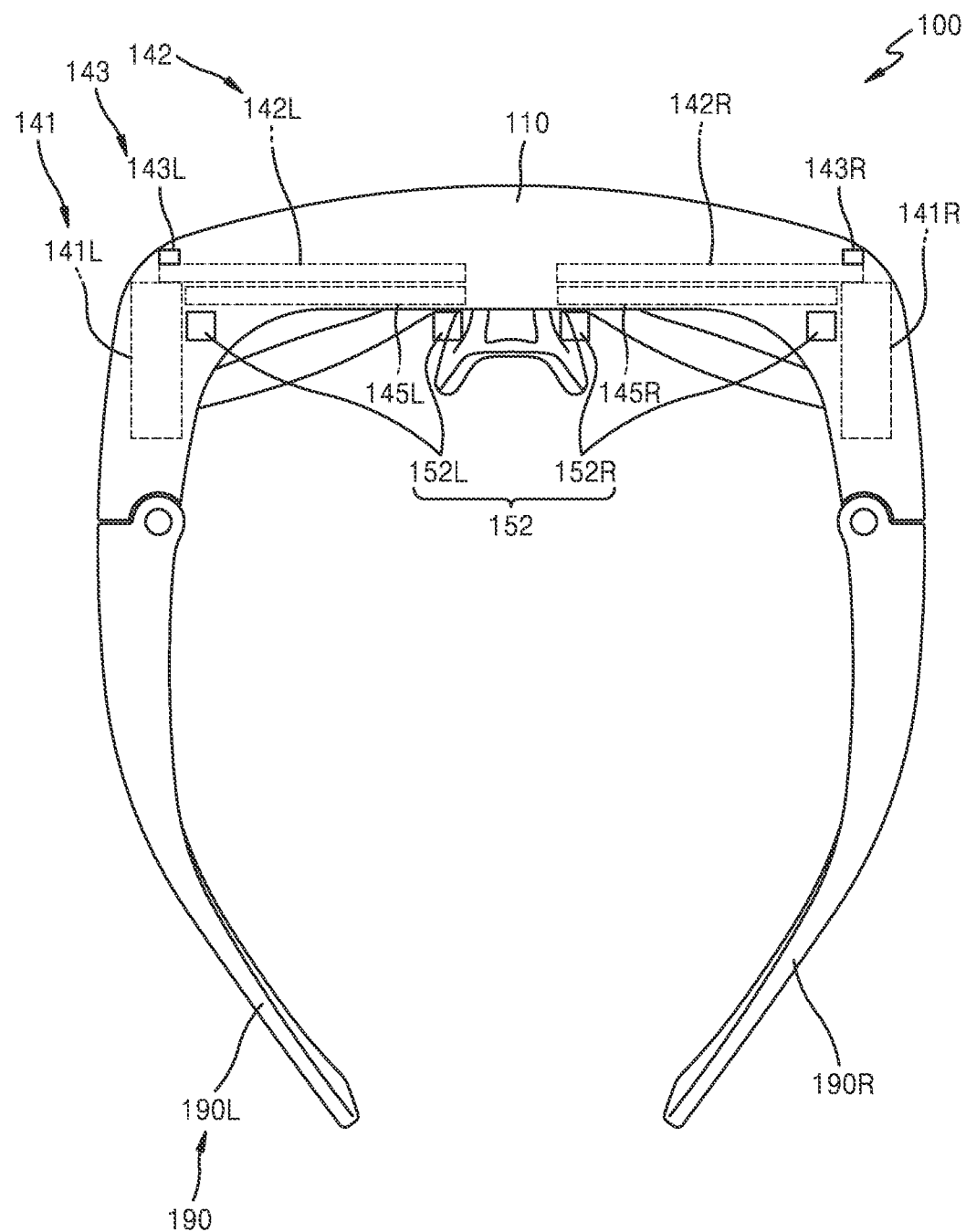
FIG. 3 illustrates an example of an electronic device according to an embodiment of the disclosure.

FIG. 3 illustrates an example of an electronic device according to an embodiment of the disclosure.

FIG. 3 shows an example of an AR device according to an embodiment of the disclosure. The electronic device 100 of FIG. 2 may be implemented as, for example, an eyeglass-type display device including an eyeglass-shaped body configured to be worn by a user, as shown in FIG. 3, but is not limited thereto.

The eyeglass-shaped body may include a frame 110 and temples 190. The temples 190 may include a left temple 190L and a right temple 190R that are respectively connected to both end pieces of the frame 110.

In addition, a varifocal lens 145 and a waveguide 142 may be arranged in the frame 110. The varifocal lens 145 may include a left-eye varifocal lens 145L and a right-eye varifocal lens 145R. In addition, the waveguide 142 may be configured to receive projected light from an input grating and output at least a portion of the input light via an output grating. The waveguide 142 may include a left-eye waveguide 142L and a right-eye waveguide 142R.

The left-eye varifocal lens 145L and the left-eye waveguide 142L may be arranged at positions corresponding to a user's left eye, and the right-eye varifocal lens 145R and the right-eye waveguide 142R may be arranged at positions corresponding to a user's right eye. For example, the left-eye varifocal lens 145L may be attached to the left-eye waveguide 142L, or the right-eye varifocal lens 145R may be attached to the right-eye waveguide 142R, but embodiments of the disclosure are not limited thereto.

In addition, the optical engine 141 including a projector for projecting light carrying an image may include a left-eye optical engine 141L and a right-eye optical engine 141R. The left- and right-eye optical engines 141L and 141R may be respectively located at both the end pieces of the frame 110. Light emitted from the optical engine 141 may be displayed via the waveguide 142.

In addition, the light sensor 143 may be disposed in front of the waveguide 142, opposite to the optical engine 141 disposed behind the waveguide 142, to detect light projected from the optical engine 141 toward the waveguide 142. The light sensor 143 may detect, from among the light projected from the optical engine 141, light that is not diffracted inside the waveguide 142 but transmitted through the front surface of the waveguide 142. The light sensor 143 may include a left-eye light sensor 143L and a right-eye light sensor 143R.

The electronic device 100 may include an eye tracking sensor 152 to track a user's gaze. According to an embodiment of the disclosure, the eye tracking sensor 152 may include a first eye tracking sensor 152L for tracking a user's left eye gaze and a second eye tracking sensor 152R for tracking a user's right eye gaze.

Figure 4:
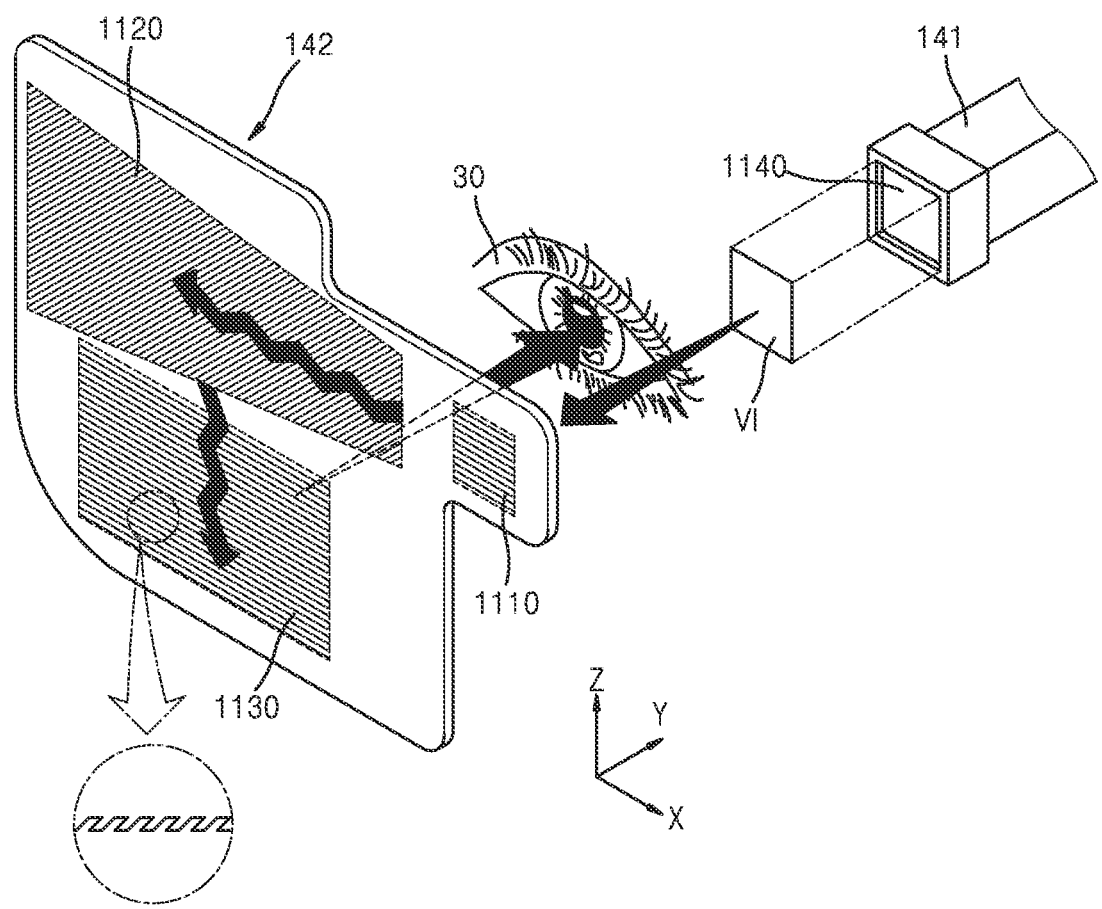
FIG. 4 is a diagram for describing an optical engine and a waveguide, according to an embodiment of the disclosure.

FIG. 4 is a diagram for describing an optical engine and a waveguide according to an embodiment of the disclosure.

The optical engine 141 may be configured to generate light of a virtual image and include an image panel and a projector including a projection optical system, etc.

The optical engine 141 may include a light source for emitting light, an image panel for forming a two-dimensional (2D) virtual image by using the light output from the light source, and a projection optical system for projecting light of the virtual image formed by the image panel. The light source may be an optical component for emitting light and generate light by adjusting red-green-blue (RGB) colors. For example, the light source may be composed of light-emitting diodes (LEDs). The image panel 150 may be a reflective image panel that modulates light emitted by the light source into light containing a 2D image and reflects the modulated light. The reflective image panel may be, for example, a digital micromirror device (DMD) panel, a liquid crystal on silicon (LCoS) panel, or any other known reflective image panel. The projection optical system may project the light containing the 2D image, which is reflected by the image panel, onto the waveguide 142, and include one or more projection lenses.

The optical engine 141 may obtain image data constituting a virtual image from the processor 120, generate a virtual image based on the obtained image data, and project light that forms the virtual image and is emitted from the light source onto the waveguide 142 via an exit surface 1140. The processor 120 may provide image data including RGB color values and brightness values of a plurality of pixels in the virtual image to the optical engine 141, and the optical engine 141 may project light that forms the virtual image onto the waveguide 142 by controlling the light source according to a RGB color value and a brightness value of each of the pixels. The optical engine 141 may project a virtual image using a transmissive projection technology in which the light source is modulated by an optically active material illuminated with white light.

The waveguide 142 may be formed of a transparent material that makes a region of a rear surface visible when the user wears the electronic device 100. The rear surface of the waveguide 142 is a surface facing a user's eye when the user wears the electronic device 100, and a front surface of the waveguide 142 is a surface opposite to the rear surface (a side of the waveguide farther away from the user's eye).

According to an embodiment of the disclosure, the waveguide 142 may be formed as a flat plate having a single-layer or multi-layer structure made of a transparent material inside which light may be reflected as it propagates. The waveguide 142 may include a first region 1110 that faces an exit surface 1140 of the optical engine 141 to receive light forming a projected virtual image VI, a second region 1120 through which the light forming the virtual image VI and incident on the first region 1110 propagates, and a third region 1130 through which the light of the virtual image VI propagating in the second region 1120 is output toward the user's eye.

Diffraction gratings for changing an optical path of the light forming the virtual image VI may be provided in the first through third regions 1110, 1120, and 1130. The waveguide 142 may change a propagation path of the light of the virtual image VI by using the diffraction gratings provided in the first through third regions 1110, 1120, and 1130, and may eventually perform a function of a light guide plate so that reflected light of the virtual image VI may be output toward the user's eye via the third region 1130.

Figure 5:
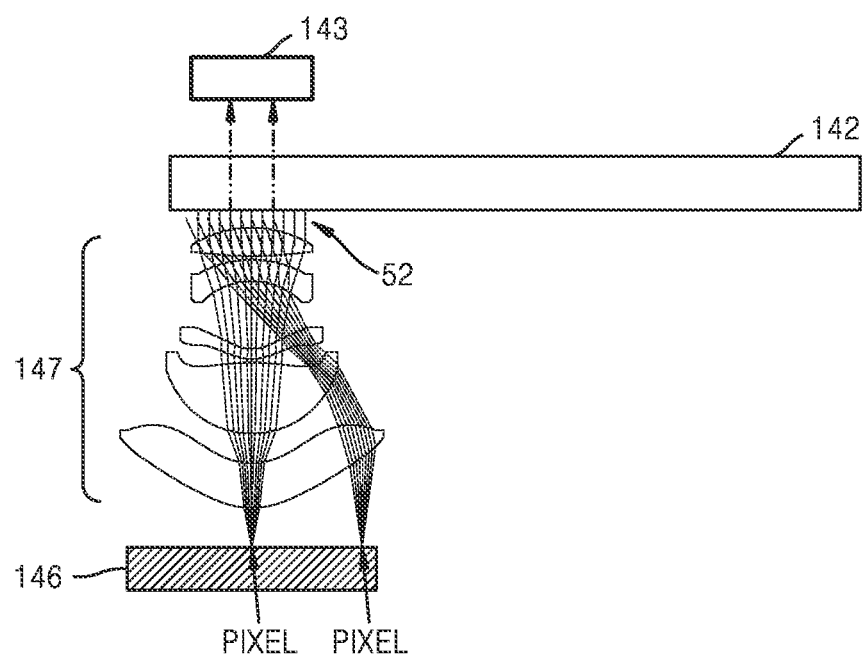
FIG. 5 is a diagram for describing light projected through a projection lens according to an embodiment of the disclosure.

FIG. 5 is a diagram for describing light projected from a projection lens according to an embodiment of the disclosure.

According to an embodiment of the disclosure, the projection lens 147 may include one or a plurality of lenses.

The projection lens 147 may be designed such that light of a virtual image formed by the image panel 146 is refracted while passing through the projection lens 147 composed of a plurality of lenses and is incident in the form of parallel light 52 when arriving to the waveguide 142.

A bundle of light rays for pixels in a virtual image may be incident parallel to each other according to a design such as a refractive power of the plurality of lenses constituting the projection lens 147, an arrangement interval of the plurality of lenses, and a back focal length between the projection lens 147 and the image panel 146.

According to an embodiment of the disclosure, the electronic device 100 may detect light from a plurality of pixels constituting the entire virtual image via the light sensor 143. In addition, the electronic device 100 may detect, via the light sensor 143, light of one or a plurality of pixels constituting a pixel region of the virtual image (e.g., a region in the center of the virtual image).

FIG. 5 is illustrated to explain an embodiment of the disclosure, but embodiments are not limited thereto.

Figure 6:
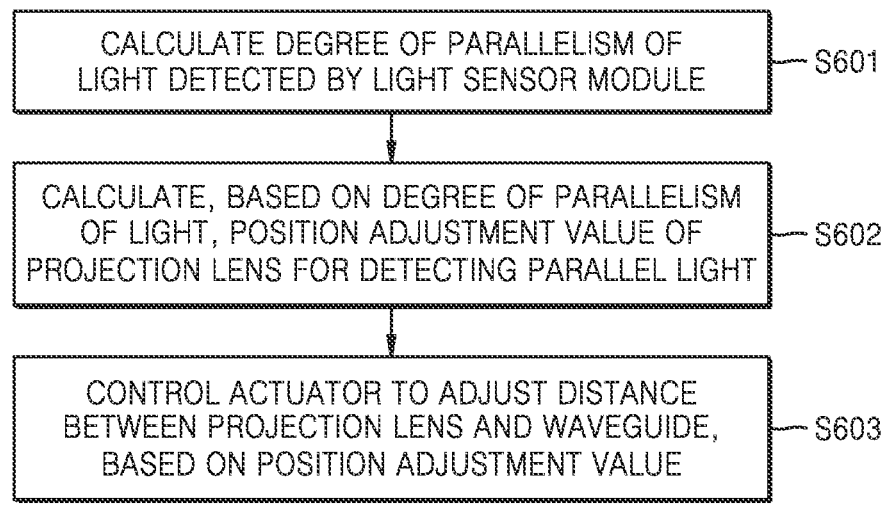
FIG. 6 is a flowchart of an operating method of an electronic device, according to an embodiment of the disclosure.

FIG. 6 is a flowchart of an operating method of an electronic device, according to an embodiment of the disclosure.

Referring to FIG. 6, the electronic device 100 may calculate a degree of parallelism of light detected by the light sensor 143 (S601).

According to an embodiment of the disclosure, the light sensor 143 may include an image sensor or a phase difference sensor. According to an embodiment of the disclosure, the electronic device 100 may detect, by using the light sensor 143, light that is not diffracted in the waveguide 142 but transmitted through the front surface of the waveguide 142 from among light passing through the input grating 148 of the waveguide 142.

For example, the electronic device 100 may detect a contrast value of a pixel region of a virtual image based on the detected light by using an image sensor and calculate a degree of parallelism of the light based on the detected contrast value.

Furthermore, for example, the electronic device 100 may calculate a degree of parallelism of light based on a phase difference detected by using a phase difference sensor.

In addition, according to an embodiment of the disclosure, the light sensor 143 may include a photodiode sensor.

According to an embodiment of the disclosure, the electronic device 100 may detect, by using a photodiode sensor, intensity of light diffracted from a diffraction region 164 (FIG. 12) in a surface opposite to the input grating 148 based on light that is not diffracted inside the waveguide 142 among light passing through the input grating 148.

For example, the electronic device 100 may calculate the degree of parallelism of light based on the intensity of the light detected by using the photodiode sensor.

The electronic device 100 may calculate, based on the degree of parallelism of the light, a position adjustment value of the projection lens 147 for detecting parallel light (S602).

According to an embodiment of the disclosure, when it is determined, based on the degree of parallelism of the light, that the parallel light is incident, the electronic device 100 may not change a position of the projection lens 147.

In addition, according to an embodiment of the disclosure, when it is determined, based on the degree of parallelism of the light, that parallel light is not incident, the electronic device 100 may calculate a position adjustment value including a direction (for example, up, down, left, or right) in which and a distance (for example, 0.1 mm) by which the projection lens 147 has to be moved relative to the optical axis in order to adjust a distance between the projection lens 147 and the waveguide 142.

The electronic device 100 may control the actuator 144 (FIG. 1) to adjust the distance between the projection lens 147 (FIG. 1) and the waveguide 142 based on the position adjustment value (S603).

According to an embodiment of the disclosure, the electronic device 100 may adjust the distance between the projection lens 147 and the waveguide 142 by adjusting the position of the projection lens 147 relative to the optical axis of the projection lens 147 based on the direction and the distance included in the calculated position adjustment value. Accordingly, the electronic device 100 may control parallel light to be incident onto the waveguide 142 from the projection lens 147.

Figure 7:
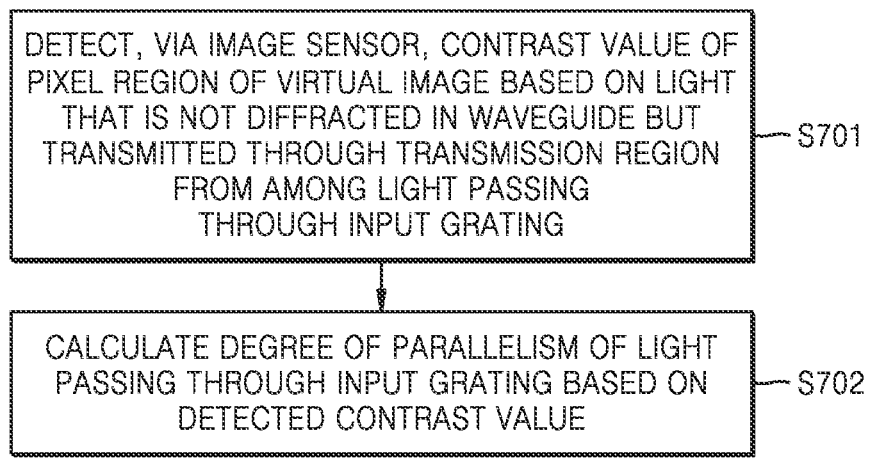
FIG. 7 is a flowchart of a method of calculating a degree of parallelism of light by using an image sensor, according to an embodiment of the disclosure.
Figure 8:
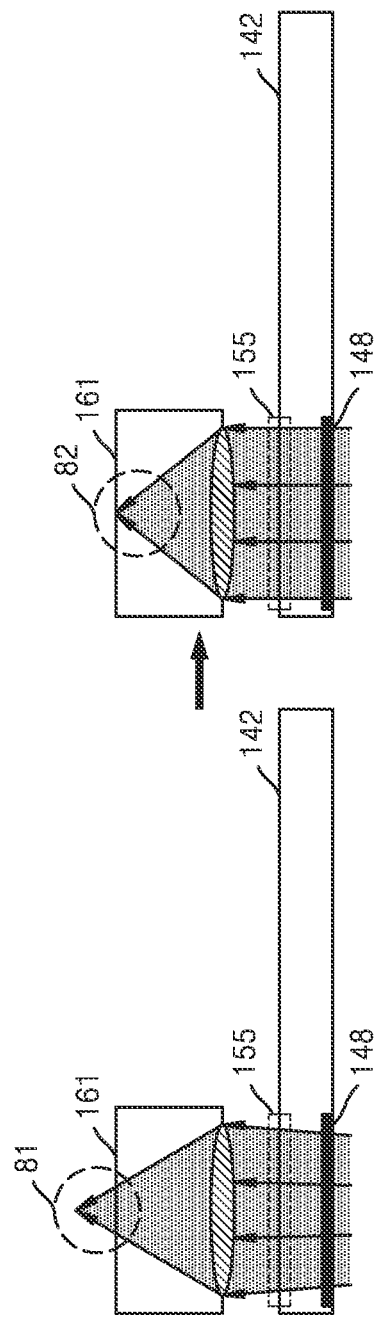
FIG. 8 is a diagram for describing a method of calculating the degree of parallelism of light by using an image sensor, according to an embodiment of the disclosure.

FIG. 7 is a flowchart of a method of calculating a degree of parallelism of light by using an image sensor, according to an embodiment of the disclosure. FIG. 8 is a diagram for describing a method of calculating the degree of parallelism of light by using an image sensor, according to an embodiment of the disclosure. The method of FIG. 7 is described in detail with reference to FIG. 8.

Referring to FIG. 8, the light sensor 143 may include the image sensor 161.

Referring to FIG. 7, the electronic device 100 may detect, via the image sensor 161, a contrast value of a pixel region of a virtual image based on light that is not diffracted in the waveguide 142 but transmitted through the transmission region 155 from among light passing through the input grating 148 (S701).

According to an embodiment of the disclosure, the electronic device 100 may detect the light passing through the waveguide 142 by using the image sensor 161. The electronic device 100 may detect a contrast value based on light that is transmitted through the transmission region 155 without changing an optical path within the waveguide 142 from among the light passing through the input grating 148 of the waveguide 142.

Referring to FIG. 8, when the light incident through the transmission region 155 is not parallel, a bundle of light rays reaching a reference plane of the image sensor 161 do not converge at a point on the reference plane 81, and thus, a relatively low contrast value may be detected.

When the light incident through the transmission region 155 is parallel, the bundle of light rays reaching the reference plane of the image sensor 161 converge at a point on the reference plane 82, and thus, a relatively high contrast value may be detected.

Referring to FIG. 7, the electronic device 100 may calculate a degree of parallelism of the light passing through the input grating 148 based on the detected contrast value (S702).

When a contrast value detected using the image sensor 161 is relatively high, for example, the detected contrast value is greater than or equal to a preset value, the electronic device 100 may determine that parallel light is incident.

Furthermore, when a contrast value detected using the image sensor 161 is relatively low, for example, the detected contrast value is less than the preset value, the electronic device 100 may determine that parallel light is not incident and calculate a position adjustment value based on which the projection lens 147 has to be moved so that the parallel light is incident.

FIG. 8 is illustrated to explain an embodiment of the disclosure, but embodiments are not limited thereto.

Figure 9:
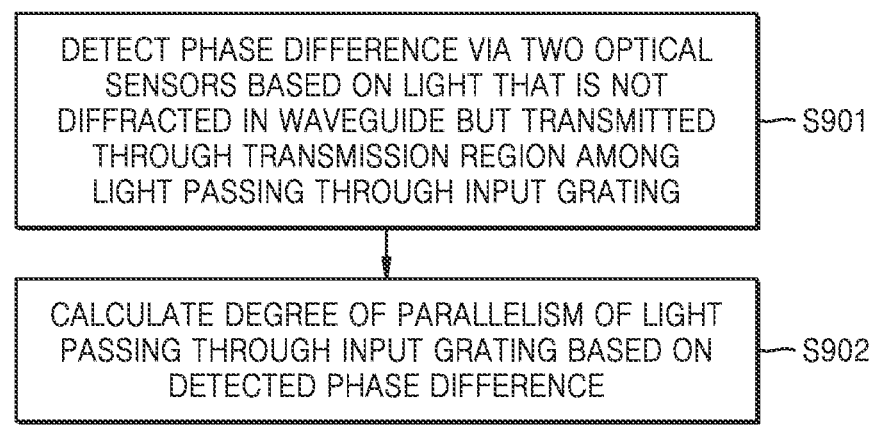
FIG. 9 is a flowchart of a method of calculating the degree of parallelism of light by using a phase difference sensor, according to an embodiment of the disclosure.
Figure 10:
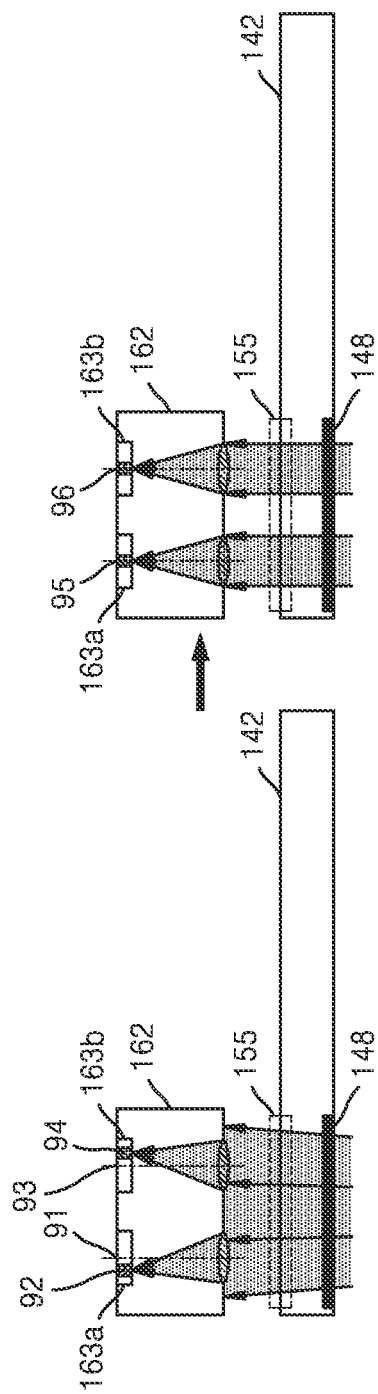
FIG. 10 is a diagram for describing a method of calculating the degree of parallelism of light by using a phase difference sensor, according to an embodiment of the disclosure.

FIG. 9 is a flowchart of a method of calculating the degree of parallelism of light by using a phase difference sensor, according to an embodiment of the disclosure. FIG. 10 is a diagram for describing a method of calculating the degree of parallelism of light by using a phase difference sensor, according to an embodiment of the disclosure. The method of FIG. 9 is described in detail with reference to FIG. 10.

Referring to FIG. 10, the light sensor 143 may include the phase difference sensor 162 including two optical sensors, for example, a first optical sensor 163*a* and a second optical sensor 163*b*, which are spaced apart from each other by a certain distance.

Referring to FIG. 9, the electronic device 100 may detect a phase difference via the first and second optical sensors 163*a* and 163*b* based on light that is not diffracted in the waveguide 142 but transmitted through the transmission region 155 from among light passing through the input grating 148 (S901). The electronic device 100 may calculate a degree of parallelism of the light passing through the input grating 148 based on the detected phase difference (S902).

Referring to FIG. 10, for example, the first and second optical sensors 163*a* and 163*b* may each include a line sensor for sensing the intensity of light, and may be arranged in a line with a certain distance apart.

For example, when the first and second optical sensors 163*a* and 163*b* respectively sense light at central points 95 and 96 thereof, the light incident on the input grating 148 may be determined to be parallel light.

Furthermore, for example, when the first and second optical sensors 163*a* and 163*b* respectively sense light at points 92 and 94 that are respectively a distance apart from the central points 91 and 93, the electronic device 100 may detect a phase difference based on the distance, and determine that the light incident on the input grating 148 is not parallel. When it is determined that parallel light is not incident, the electronic device 100 may calculate a position adjustment value based on which the projection lens 147 has to move so that parallel light is incident.

FIG. 10 is illustrated to explain an embodiment of the disclosure, but embodiments are not limited thereto.

Figure 11:
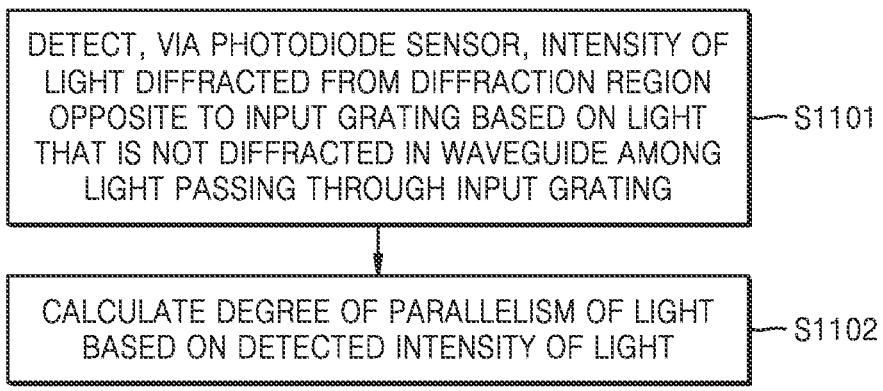
FIG. 11 is a flowchart of a method of calculating the degree of parallelism of light by using a photodiode sensor, according to an embodiment of the disclosure.

FIG. 11 is a flowchart of a method of calculating the degree of parallelism of light by using a photodiode sensor, according to an embodiment of the disclosure. FIG. 12 is a diagram for describing a method of calculating the degree of parallelism of light by using a photodiode sensor, according to an embodiment of the disclosure. The method of FIG. 11 is described in detail with reference to FIG. 12.

Referring to FIG. 12, the light sensor 143 may include the photodiode sensor 165.

According to an embodiment of the disclosure, the photodiode sensor 165 may be arranged to receive light diffracted from the diffraction region 164 opposite to the input grating 148 from among light that passes through the input grating 148 but is not diffracted in the waveguide 142.

For example, the photodiode sensor 165 may face the diffraction region 164 in the front surface of the waveguide 142 and may be arranged at a distance apart from the input grating 148 in the rear surface of the waveguide 142.

According to an embodiment of the disclosure, the diffraction region 164 may be composed of a diffraction grating for changing a path of light incident as parallel light. Accordingly, some of the light incident as parallel light onto the diffraction region 164 from the input grating 148 may be diffracted and detected by the photodiode sensor 165. When the light incident onto the diffraction region 164 from the input grating 148 is not parallel, a path of the light is not changed in the diffraction region 164.

Referring to FIG. 11, the electronic device 100 may detect, by using the photodiode sensor 165, the intensity of light diffracted from the diffraction region 164 opposite to the input grating 148 based on light that is not diffracted in the waveguide 142 among light passing through the input grating 148 (S1101).

According to an embodiment of the disclosure, parallel light incident onto the diffraction region 164 from the input grating 148 may change its path and be projected toward the photodiode sensor 165.

Because the diffraction region 164 is composed of a diffraction grating configured to change a light path only for parallel light, when non-parallel light is incident, the incident light is not diffracted, and thus, light is not detected by the photodiode sensor 165.

In FIG. 11, the electronic device 100 may calculate a degree of parallelism of the light based on the detected intensity of the light (S1102).

According to an embodiment of the disclosure, when the intensity of the light detected by using the photodiode sensor 165 is greater than or equal to a preset value, the electronic device 100 may determine that parallel light is incident on the input grating 148.

Furthermore, according to an embodiment of the disclosure, when light is not detected by the photodiode sensor 165, the electronic device 100 may determine that the light projected onto the input grating 148 is not parallel light. When it is determined that parallel light is not incident, the electronic device 100 may calculate a position adjustment value based on which the projection lens 147 has to move so that parallel light is incident.

FIG. 12 is illustrated to explain an embodiment of the disclosure, but embodiments are not limited thereto.

Figure 13:
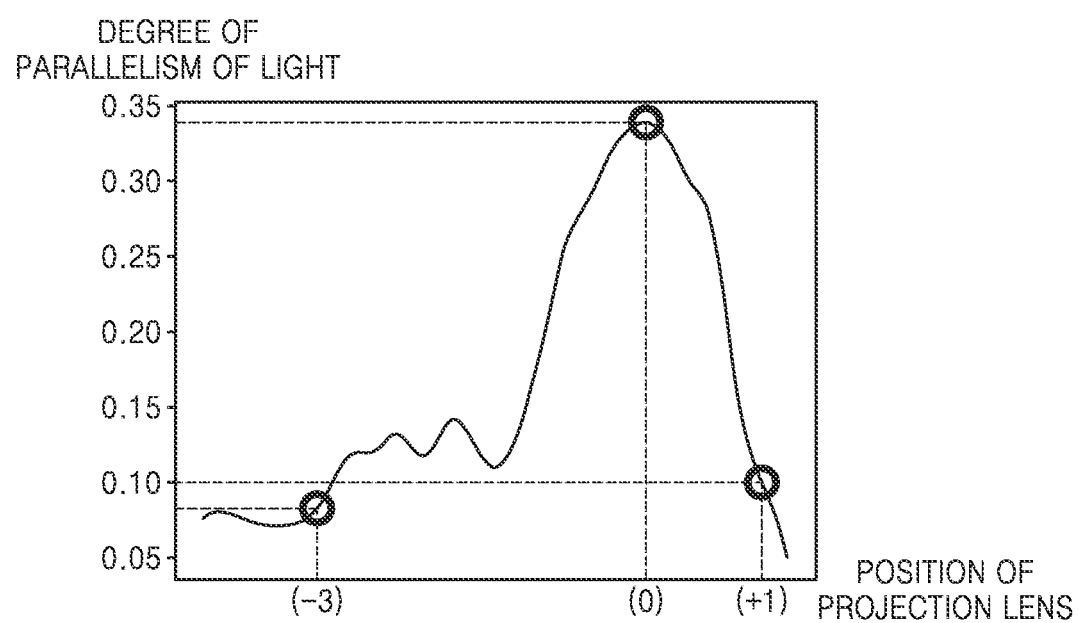
FIG. 13 is a diagram for describing an example of the degree of parallelism of light with respect to a position of a projection lens, according to an embodiment of the disclosure.

FIG. 13 is a diagram for describing an example of the degree of parallelism of light with respect to a position of a projection lens, according to an embodiment of the disclosure.

According to an embodiment of the disclosure, the degree of parallelism of light projected from the projection lens 147 (FIG. 1) onto the waveguide 142 (FIG. 1) may vary according to a position of the projection lens 147. According to an embodiment of the disclosure, the degree of parallelism of light projected from the projection lens 147 onto the waveguide 142 may vary according to a separation distance between the projection lens 147 and the waveguide 142.

Referring to a graph of FIG. 13, for example, when the position of a projection lens 147 is a position of (0), the degree of parallelism of light may be calculated as 0.3. In this case, a clear virtual image may be provided via the waveguide 142.

Furthermore, for example, when the position of the projection lens 147 is a position of (+1), the degree of parallelism of light may be calculated as 0.1. In this case, a virtual image provided via the waveguide 142 may be out of focus. In addition, for example, when the position of the projection lens 147 is a position of (−3), the degree of parallelism of light may be calculated as 0.07. In this case, a virtual image provided via the waveguide 142 may be a blurry image that is out of focus.

According to an embodiment of the disclosure, during manufacture of the electronic device 100, the projection lens 147 may be arranged at a position having a separation distance large enough to project parallel light from the projection lens 147 onto the waveguide 142. In a usage environment, as a position of the projection lens 147 changes due to factors such as temperature changes, a separation distance between the projection lens 147 and the waveguide 142 may be changed. The electronic device 100 may determine whether light projected from the projection lens 147 onto the waveguide 142 is parallel, and when the light is not parallel, adjust a separation distance between the projection lens 147 and the waveguide 142 by adjusting the position of the projection lens 147 to a position such that parallel light may be incident. Accordingly, a high-quality virtual image may be provided to the user.

FIG. 12 is illustrated to explain an embodiment of the disclosure, but embodiments are not limited thereto.

The above-described embodiments of the disclosure may be written as programs executable on a computer, and be implemented by a general-purpose digital computer for operating the programs by using a computer-readable medium. Data structures used in the above-described embodiments of the disclosure may be recorded on the computer-readable medium via a variety of means. The above-described embodiments of the disclosure may be implemented in the form of a recording medium including instructions executable by the computer, such as a program module executed by the computer. For example, methods implemented by software modules or algorithms may be stored in a computer-readable medium as computer-readable codes or program commands executable by the computer.

The computer-readable recording medium may be any recording medium that are accessible by the computer, and examples thereof may include both volatile and non-volatile media and both detachable and non-detachable media. Examples of the computer-readable medium may include magnetic storage media (e.g., ROM, floppy disks, and hard disks) and optical recording media (e.g., compact disc-ROM (CD-ROM) and digital versatile discs (DVDs)), but are not limited thereto. Furthermore, the computer-readable recording medium may include a computer storage medium and a communication medium.

A plurality of computer-readable recording media may be distributed over network-coupled computer systems, and data, e.g., program instructions and codes, stored in the distributed recording media may be executed by at least one computer.

A computer-readable storage medium may be provided in the form of a non-transitory storage medium. In this regard, the term 'non-transitory' only means that the storage medium does not include a signal (e.g., an electromagnetic wave) and is a tangible device, and the term does not differentiate between where data is semi-permanently stored in the storage medium and where the data is temporarily stored in the storage medium. For example, the 'non-transitory storage medium' may include a buffer in which data is temporarily stored.

According to an embodiment of the disclosure, methods according to various embodiments of the disclosure set forth herein may be included in a computer program product when provided. The computer program product may be traded, as a product, between a seller and a buyer. For example, the computer program product may be distributed in the form of a computer-readable storage medium (e.g., CD-ROM) or distributed (e.g., downloaded or uploaded) on-line via an application store or directly between two user devices (e.g., smartphones). For online distribution, at least a part of the computer program product (e.g., a downloadable app) may be at least transiently stored or temporally created on a computer-readable storage medium such as a server of a manufacturer, a server of an application store, or a memory of a relay server.

Particular implementations described herein merely correspond to embodiments of the disclosure and do not limit the scope of the disclosure in any way. For the sake of brevity of the specification, conventional electronic configurations, control systems, software, and other functional aspects of the systems may be omitted.

The above description of the disclosure is provided for illustration, and it will be understood by one of ordinary skill in the art that changes in form and details may be readily made therein without departing from technical idea or essential features of the disclosure. Accordingly, the above-described embodiments of the disclosure and all aspects thereof are merely examples and are not limiting. For example, each component defined as an integrated component may be implemented in a distributed fashion, and likewise, components defined as separate components may be implemented in an integrated form.

The use of any and all examples or exemplary language, e.g., "such as", etc., provided herein is merely intended to describe the embodiments of the disclosure in detail and does not pose a limitation on the scope of the disclosure unless otherwise limited by the claims.

In addition, an element may not be necessarily essential in the embodiments unless the element is specifically described as "essential," "crucial," etc.

It will be understood by one of ordinary skill in the art that embodiments of the disclosure may be implemented in a modified form without departing from the essential characteristics of the description.

It should be understood that various transformations may be made in the embodiments of the disclosure and the disclosure is not limited by particular embodiments described in the specification, and that the disclosure cover all transformations, equivalents, and alternatives falling within the spirit and scope of the disclosure. Therefore, the above-described embodiments of the disclosure should be considered in a descriptive sense only and not for purposes of limitation.

The scope of the disclosure is defined not by the detailed description thereof but by the following claims, and all the changes or modifications within the meaning and scope of the appended claims and their equivalents should be construed as being included in the scope of the disclosure.

As used herein, the term "unit" or "module" indicates a unit for processing at least one function or operation and may be implemented using hardware or software or a combination of hardware and software.

The term "unit" or "module" may also be implemented as a program stored in an addressable storage medium and executable by a processor.

For example, the term "unit" or "module" may be implemented as elements such as software elements, object-oriented software elements, class elements, and task elements, processes, functions, attributes, procedures, subroutines, segments of program code, drivers, firmware, micro-codes, circuits, data, a database, data structures, tables, arrays, and variables.

As used herein, the expression "component A may include one of a1, a2, and a3" broadly means that an example of an element that may be included in component A is a1, a2, or a3.

The expression does not limit the element that may be included in component A to a1, a2, or a3. Therefore, it should be noted that the expression is not restrictively construed to exclude elements other than a1, a2, and a3 from examples of the element that may be included in component A.

The expression also means that component A may include a1, include a2, or include a3. The expression does not mean that elements included in component A are always selectively determined within a certain set. For example, it should be noted that the expression is not restrictively construed to limit the element included in component A to a1, a2, or a3 that is selected from a set including a1, a2, and a3.

What is claimed is:

1. An electronic device comprising:
    an optical engine comprising a projection lens configured to project light of a virtual image;
    a waveguide comprising an input grating on which the light of the virtual image is incident;
    an actuator configured to adjust a position of the projection lens relative to an optical axis of the projection lens;
    a light sensor configured to detect light passing through the input grating;
    a memory storing one or more instructions; and
    a processor configured to execute the one or more instructions to:
        obtain a degree of parallelism of the light detected by the light sensor; and
        control the actuator to adjust a distance between the projection lens and the waveguide based on the degree of parallelism of the light.

2. The electronic device of claim 1, wherein the input grating is provided on a first surface of the waveguide and comprises a diffraction grating so that light incident on the waveguide through the input grating changes a path within the waveguide, and
    wherein the light sensor is provided on a second surface of the waveguide, opposite to the first surface, and configured to receive light that is not diffracted within the waveguide from among the light passing through the input grating.

3. The electronic device of claim 1, wherein the light sensor comprises an image sensor, and
    wherein the processor is further configured to execute the one or more instructions to:
        detect, by using the image sensor, a contrast value of a pixel region of the virtual image, based on light that is not diffracted within the waveguide but transmitted through a transmission region from among the light passing through the input grating; and
        obtain, based on the detected contrast value, the degree of parallelism of the light passing through the input grating.

4. The electronic device of claim 1, wherein the light sensor comprises a phase difference sensor comprising two optical sensors that are spaced apart from each other, and
    wherein the processor is further configured to execute the one or more instructions to:
        detect a phase difference via the two optical sensors, based on light that is not diffracted in the waveguide but transmitted through a transmission region from among the light passing through the input grating; and
        obtain, based on the detected phase difference, the degree of parallelism of light passing through the input grating.

5. The electronic device of claim 1, wherein the light sensor comprises a photodiode sensor, and
    wherein the photodiode sensor is configured to receive light diffracted from a diffraction region opposite to the input grating from among light that passes through the input grating but is not diffracted in the waveguide.

6. The electronic device of claim 5, wherein the processor is further configured to execute the one or more instructions to:
    detect, by using the photodiode sensor, intensity of the light diffracted from the diffraction region opposite to the input grating; and
    obtain, based on the detected intensity of the light, the degree of parallelism of the light.

7. The electronic device of claim 1, wherein the processor is further configured to execute the one or more instructions to:
    obtain a position adjustment value of the projection lens for detecting the light, based on the degree of parallelism of the light, and
    control the actuator to adjust the distance based on the obtained position adjustment value.

8. An operating method of an electronic device comprising a projection lens configured to project light of a virtual image, the operating method comprising:
    detecting, by a light sensor of the electronic device, light passing through an input grating of a waveguide on which the light of the virtual image is incident;
    obtaining a degree of parallelism of the light detected by the light sensor; and
    controlling an actuator of the electronic device to adjust a distance between the projection lens and the waveguide, based on the degree of parallelism of the light.

9. The operating method of claim 8, wherein the input grating is provided on a first surface of the waveguide and comprises a diffraction grating so that light incident on the waveguide through the input grating changes a path within the waveguide, and
    wherein the light sensor is provided on a second surface of the waveguide opposite to the first surface, and configured to receive light that is not diffracted within the waveguide from among the light passing through the input grating.

10. The operating method of claim 8, wherein the light sensor comprises an image sensor,
    wherein the detecting of the light comprises detecting, by using the image sensor, a contrast value of a pixel region of the virtual image, based on light that is not diffracted within the waveguide but transmitted through a transmission region from among the light passing through the input grating, and
    wherein the obtaining of the degree of parallelism of the light comprises obtaining, based on the detected contrast value, the degree of parallelism of the light passing through the input grating.

11. The operating method of claim 8, wherein the light sensor comprises a phase difference sensor comprising two optical sensors spaced apart from each other,
    wherein the detecting of the light comprises detecting a phase difference via the two optical sensors, based on light that is not diffracted in the waveguide but transmitted through a transmission region from among the light passing through the input grating, and
    wherein the obtaining of the degree of parallelism of the light comprises obtaining, based on the detected phase difference, the degree of parallelism of the light passing through the input grating.

12. The operating method of claim 8, wherein the light sensor comprises a photodiode sensor, and wherein the photodiode sensor is configured to receive light diffracted from a diffraction region opposite to the input grating from among light that passes through the input grating but is not diffracted in the waveguide.

13. The operating method of claim 12, wherein the detecting of the light comprises detecting, by using the photodiode sensor, intensity of the light diffracted from the diffraction region opposite to the input grating, and
wherein the obtaining of the degree of parallelism of the light comprises obtaining, based on the detected intensity of the light, the degree of parallelism of the light.

14. The operating method of claim 8, further comprising:
obtaining a position adjustment value of the projection lens to detect parallel light, based on the degree of parallelism of the light, and
wherein the controlling the actuator comprises controlling the actuator to adjust the distance based on the obtained position adjustment value.

15. A non-transitory computer-readable recording medium having recorded thereon a program for executing an operating method of an electronic device comprising a projection lens configured to project light of a virtual image on a computer, the operating method comprising:
detecting, by a light sensor of the electronic device, light passing through an input grating of a waveguide on which the light of the virtual image is incident;
obtaining a degree of parallelism of the light detected by the light sensor; and
controlling an actuator of the electronic device to adjust a distance between the projection lens and the waveguide based on the degree of parallelism of the light.

16. The non-transitory computer-readable recording medium of claim 15, wherein the light sensor comprises an image sensor,
wherein the detecting of the light comprises detecting, by using the image sensor, a contrast value of a pixel region of the virtual image, based on light that is not diffracted within the waveguide but transmitted through a transmission region from among the light passing through the input grating, and
wherein the obtaining of the degree of parallelism of the light comprises calculating, based on the detected contrast value, the degree of parallelism of the light passing through the input grating.

17. The non-transitory computer-readable recording medium of claim 15, wherein the light sensor comprises a phase difference sensor comprising two optical sensors spaced apart from each other,
wherein the detecting of the light comprises detecting a phase difference via the two optical sensors, based on light that is not diffracted in the waveguide but transmitted through a transmission region from among the light passing through the input grating, and
wherein the obtaining of the degree of parallelism of the light comprises obtaining, based on the detected phase difference, the degree of parallelism of the light passing through the input grating.

18. The non-transitory computer readable medium of claim 15, further comprising:
obtaining a position adjustment value of the projection lens to detect parallel light, based on the degree of parallelism of the light, and
wherein the controlling the actuator comprises controlling the actuator to adjust the distance based on the obtained position adjustment value.

* * * * *